(12) United States Patent
Swanson (10) Patent No.: US 9,133,889 B2
(45) Date of Patent: *Sep. 15, 2015

(54) FAN CLUTCH APPARATUS AND METHODS

(71) Applicant: KIT MASTERS INC., Perham, MN (US)

(72) Inventor: Craig M. Swanson, Perham, MN (US)

(73) Assignee: Kit Masters Inc., Perham, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,649

(22) Filed: Jun. 20, 2014

(65) Prior Publication Data

US 2014/0299436 A1    Oct. 9, 2014

Related U.S. Application Data

(63) Continuation of application No. 13/011,057, filed on Jan. 21, 2011.

(60) Provisional application No. 61/297,531, filed on Jan. 22, 2010.

(51) Int. Cl.
| | |
|---|---|
| F16D 25/0632 | (2006.01) |
| F16D 13/30 | (2006.01) |
| F16D 27/01 | (2006.01) |
| F16D 25/08 | (2006.01) |
| F16D 27/00 | (2006.01) |

(52) U.S. Cl.
CPC ............ *F16D 13/30* (2013.01); *F16D 25/0632* (2013.01); *F16D 25/082* (2013.01); *F16D 27/004* (2013.01); *F16D 27/01* (2013.01); *Y02T 10/76* (2013.01)

(58) Field of Classification Search
CPC ............................. F16D 25/0632; F16D 27/01
USPC .............. 192/66.21, 66.22, 85.37, 48.2, 48.3, 192/85.22, 85.21
See application file for complete search history.

(56) References Cited

U.S. PATENT DOCUMENTS

| | | |
|---|---|---|
| 768,384 A | 8/1904 | Lockwood |
| 1,371,391 A | 3/1921 | Ollard |
| 2,172,311 A | 9/1939 | Thomas |
| 2,259,461 A | 10/1941 | Eason |
| 2,357,620 A | 9/1944 | Thomas |
| 2,369,328 A | 2/1945 | Watts |
| 2,614,396 A | 10/1952 | Ratermann |

(Continued)

OTHER PUBLICATIONS

Kysor On/Off Fan Clutch Commercial, Kysor K30 On/Off Fan Clutch for Heavy-Duty Truck Applications, BorgWarner Thermal Systems, 2006, 2 pages.

(Continued)

*Primary Examiner* — Robert Hodge
*Assistant Examiner* — Ryan Dodd
(74) *Attorney, Agent, or Firm* — Oblon, McClelland, Maier & Neustadt, L.L.P.

(57) ABSTRACT

Some embodiments of a fan clutch system may drive an output member to rotate at a first speed when opposing friction clutch surfaces are engaged and to rotate at a second, slower speed when the friction clutch surfaces are shifted to a disengaged position. In particular embodiments, the multi-speed clutch system may employ an eddy current drive system that is arranged axially rearward of the friction clutch surfaces while the fan blade device is mounted in a position that is axially forward of the of the friction clutch surfaces.

9 Claims, 5 Drawing Sheets

(56) References Cited

U.S. PATENT DOCUMENTS

| | | |
|---|---|---|
| 2,742,179 A | 4/1956 | Livers |
| 3,077,252 A | 2/1963 | Treer |
| 3,109,555 A | 11/1963 | Samans |
| 3,185,250 A | 5/1965 | Glazier |
| 3,202,252 A | 8/1965 | Schilling |
| 3,253,687 A | 5/1966 | Young |
| 3,312,319 A | 4/1967 | Carroll et al. |
| 3,396,909 A | 8/1968 | Knapp |
| 3,409,305 A | 11/1968 | Nieland |
| 3,517,683 A | 6/1970 | Chandler |
| 3,684,397 A | 8/1972 | Elmer |
| 3,762,517 A | 10/1973 | Hanks |
| 4,132,301 A | 1/1979 | Zabonick |
| 4,199,048 A | 4/1980 | Ishikawa |
| 4,226,095 A | 10/1980 | Loken |
| 4,231,457 A | 11/1980 | Cornish |
| 4,352,365 A | 10/1982 | Boccardo et al. |
| 4,355,710 A | 10/1982 | Schilling |
| 4,408,685 A | 10/1983 | Schilling et al. |
| 4,418,807 A | 12/1983 | Raines |
| 4,423,803 A | 1/1984 | Malloy |
| 4,425,993 A | 1/1984 | Schilling |
| 4,450,947 A | 5/1984 | Hanks |
| 4,456,110 A | 6/1984 | Hanks et al. |
| 4,460,079 A | 7/1984 | Hanks |
| 4,483,430 A | 11/1984 | Carmichael et al. |
| 4,541,516 A | 9/1985 | Fenzel |
| 4,570,849 A | 2/1986 | Klaucke et al. |
| 4,593,801 A | 6/1986 | Takeuchi et al. |
| 4,628,953 A | 12/1986 | Correll et al. |
| 4,657,126 A | 4/1987 | Hanks et al. |
| 4,750,595 A | 6/1988 | Dayen et al. |
| 4,766,986 A | 8/1988 | Dayen et al. |
| 4,770,281 A | 9/1988 | Hanks |
| 4,826,064 A | 5/1989 | Dayen et al. |
| 4,830,161 A | 5/1989 | Hall et al. |
| 4,846,315 A | 7/1989 | Dayen |
| 4,872,535 A | 10/1989 | Dayen et al. |
| 4,877,117 A | 10/1989 | Kniebel et al. |
| 4,909,367 A | 3/1990 | Elmer |
| 4,934,500 A | 6/1990 | Hanks et al. |
| 5,059,161 A | 10/1991 | Bredt |
| 5,215,175 A | 6/1993 | Fenzel |
| 5,242,036 A | 9/1993 | Hennessy et al. |
| 5,355,983 A | 10/1994 | Radomski et al. |
| 5,398,794 A | 3/1995 | Walberg et al. |
| 5,405,254 A | 4/1995 | Hennessy et al. |
| 5,427,609 A | 6/1995 | Zoglman et al. |
| 5,586,635 A | 12/1996 | Nelson et al. |
| 5,586,636 A | 12/1996 | Linnig |
| 5,611,415 A | 3/1997 | Davis et al. |
| 5,613,586 A | 3/1997 | Schilling et al. |
| 5,624,016 A | 4/1997 | Coulter et al. |
| 5,636,719 A | 6/1997 | Davis et al. |
| 5,665,882 A | 9/1997 | Chung et al. |
| 5,667,045 A | 9/1997 | Cummings, III |
| 5,704,461 A | 1/1998 | Vatsaas et al. |
| 5,752,810 A | 5/1998 | Hein |
| 5,765,672 A | 6/1998 | Briggs et al. |
| 5,877,117 A | 3/1999 | Anderson et al. |
| 5,878,858 A | 3/1999 | Hein |
| 5,896,971 A | 4/1999 | Hein |
| 5,897,107 A | 4/1999 | Zierden et al. |
| 5,913,396 A | 6/1999 | Hein |
| 5,984,070 A | 11/1999 | Briggs et al. |
| 5,994,810 A * | 11/1999 | Davis et al. .................. 310/105 |
| 6,092,638 A | 7/2000 | Vatsaas |
| 6,109,871 A | 8/2000 | Nelson et al. |
| 6,135,029 A | 10/2000 | Oberjohn |
| 6,253,716 B1 | 7/2001 | Palmer et al. |
| 6,273,221 B1 | 8/2001 | Schmidt |
| 6,507,790 B1 | 1/2003 | Radomski |
| 6,548,929 B2 | 4/2003 | Nelson et al. |
| 6,600,249 B2 | 7/2003 | Nelson et al. |
| D478,093 S | 8/2003 | Bentley |
| 6,811,011 B2 | 11/2004 | Bastien |
| 6,838,796 B1 | 1/2005 | Nelson |
| 6,912,353 B2 | 6/2005 | Nelson et al. |
| 7,104,382 B2 | 9/2006 | Swanson et al. |
| 7,331,437 B2 | 2/2008 | Wayman |
| 7,438,169 B2 | 10/2008 | Swanson et al. |
| 7,604,106 B2 | 10/2009 | Swanson et al. |
| 8,100,239 B2 | 1/2012 | Swanson et al. |
| 8,109,375 B2 * | 2/2012 | Swanson et al. ............. 192/48.2 |
| 8,360,219 B2 | 1/2013 | Swanson |
| 8,544,627 B2 | 10/2013 | Lawrence et al. |
| 2002/0014804 A1 | 2/2002 | Nelson et al. |
| 2002/0021973 A1 | 2/2002 | Nelson |
| 2006/0131120 A1 | 6/2006 | Boffelli |
| 2006/0151278 A1 | 7/2006 | Settineri |
| 2007/0131514 A1 | 6/2007 | Sattineri |
| 2009/0014273 A1 | 1/2009 | Swanson et al. |
| 2009/0183963 A1 | 7/2009 | Swanson et al. |
| 2010/0038205 A1 | 2/2010 | Swanson et al. |
| 2010/0282562 A1 | 11/2010 | Swanson et al. |
| 2011/0180362 A1 | 7/2011 | Swanson |
| 2011/0278127 A1 * | 11/2011 | Gebhart ....................... 192/66.1 |

OTHER PUBLICATIONS

Shigley et al., Power Transmission Elements—A Mechanical Designer's Workbook, 1990, New York, McGraw-Hill, pp. 76, 91-95.

Kit Masters, Remanufactured Fan Clutches—Borg-Warner/Kysor S, [Online], Retrieved from the Internet at http://www.kit-masters.com/content_4.php, 4 pages.

Kit Masters, "2-Speed Conversion Kits" (2 pages).

Kysor, "Specify the Kysor K-22RA Fan Drive" 1996 (2 pages).

Kysor 2-Speed Kit Instructions (1 page).

Concepts NREC, "Electromagnetic Fan Clutch" 2009 (6 pages).

* cited by examiner

FAN CLUTCH APPARATUS AND METHODS

CROSS-REFERENCE TO RELATED APPLICATIONS

This application is a continuation of U.S. application Ser. No. 13/011,057 filed Jan. 21, 2011, which claims the priority benefit of U.S. Provisional Application for Patent, Ser. No. 61/1297,531 filed Jan. 22, 2010, the entire contents of each of which are incorporated herein by reference for all purposes.

BACKGROUND

Vehicle transmission systems, cooling systems, and braking systems may employ clutches or like devices to selectively transmit rotational forces from a drive source to an output member. For example, some cooling systems employ fan clutch devices that control the output rotation of engine cooling fans. Such a fan clutch can be driven by a drive pulley that rotates in response to the vehicle engine.

In general, the clutch can be operated to engage (or disengage) opposing clutch surfaces, which rotationally interconnect (or rotationally disconnect) the drive pulley and the output member. In an example related to fan clutches, when the clutch surfaces shifted to the engaged position, the output member (carrying fan blades) is driven to rotate along with the drive pulley. However, when the clutch surfaces are shifted to the disengaged position, the output member is no longer directly urged by the drive pulley.

SUMMARY

Some embodiments of a clutch system may drive an output member to rotate at a first speed when the clutch surfaces are engaged and to rotate at a second speed when the clutch surfaces are shifted to a disengaged position. In particular embodiments, the multi-speed clutch system may employ an eddy current drive system that is arranged axially rearward of the clutch surfaces to cause the output member to rotate even when the clutch surfaces are disengaged. Such an arrangement of the eddy current drive components can provide ample space for heat dissipation structures along the periphery of the eddy current drive system, especially in some embodiments in which the cooling fins of the eddy current drive system extend radially outward for exposure to the air flow path from a fan blade device mounted to a forward face of the output member.

The multi-speed clutch device can be useful, for example, to control the rotation of a cooling fan in a vehicle cooling system, such as a cooling system in semi-trucks, buses, vocational equipment (e.g., garbage trucks), or construction equipment vehicles. In such circumstances, the cooling fan can be driven to rotate at a first speed due to rotational interconnection with a drive pulley when the clutch surfaces are engaged and to rotate at a second speed even when the clutch surfaces are disengaged. Thus, the clutch system facilitates the flow of cooling air both when the vehicle cooling system activates the fan (e.g., by causing the clutch surfaces to engage) and when the vehicle cooling system deactivates the fan (e.g., by causing the clutch surfaces to disengage). Accordingly, the vehicle engine can be maintained below high-temperature threshold for greater periods of time, thereby reducing the number of times and the time duration that the fan clutch device must be engaged to rotate the fan blades at the first, full speed. As a result, the fuel efficiency of the vehicle may be substantially increased due to the reduction in load upon the engine caused by the full speed rotation of the fan blade device.

These and other embodiments described herein may be configured to provide one or more of the following advantages. First, some embodiments of the clutch devices described herein can drive an output member to rotate at a first speed when the clutch surfaces are engaged and to rotate at a second speed when the clutch surfaces are shifted to a disengaged position. In particular, the clutch device can employ an eddy current drive system that urges the output member of the clutch device to rotate at the second speed (which may be slower than the first speed).

Second, the eddy current drive components (e.g., permanent magnets and an opposing eddy current ring) can be positioned axially rearward of the friction drive surfaces while the fan blade device is positioned axially forward of the friction drive surfaces. Such an arrangement can provide additional space for cooling fins along a periphery of one or more eddy current drive components without interfering with the operation of the fan blade device. Further, such an arrangement provides an operable eddy current drive system without substantially increasing the size of the clutch device in the region that is radially outward of the friction clutch components.

Third, some embodiments of the clutch device can be implemented with a cooling fan so as to provide different levels of air flow output from the cooling fan. For example, the fan clutch device can be useful for cooling systems in some vehicles that operate with extended periods of idle, such as semi-trucks, buses, vocational equipment (e.g., garbage trucks), or construction equipment vehicles. In such circumstances, the fan clutch device facilitates the flow of cooling air both when the vehicle cooling system activates the fan (e.g., by causing the clutch surfaces to engage) and when the vehicle cooling system deactivates the fan (e.g., by causing the clutch surfaces to disengage). As described below, periods of increased noise from the vehicle cooling fan rotating at the first (higher) speed can be reduced or eliminated due to the flow of cooling air from the fan rotating at the second (slower) speed.

Fourth, the eddy current drive system of the clutch device may include permanent magnets that are arranged adjacent to the electrically conductive ring in a manner that provides consistent operation and efficient dissipation of heat from the eddy current drive components. For example, in some embodiments, the conductive ring can be arranged radially outward from the permanent magnets so that the heat generated by the production of eddy currents in the conductive ring can be dissipated radially outward through a plurality of cooling fins. Also, the conductive ring (and the cooling fins attached thereto) can rotate at the first (higher) speed with the drive pulley during operation, thereby causing the cooling fins to generate increased air movement that enhances the heat dissipation from the conductive ring.

Fifth, the conductive ring of the eddy current drive system can be formed from a generally nonmagnetic material such as aluminum or the like. In such circumstances, the ring is not necessarily attracted or repelled by the magnets during assembly, which reduces the complexity of aligning and assembling components of the clutch device. Furthermore, in those embodiments in which the conductive ring is formed from a nonmagnetic material such as aluminum or the like, the conductive ring may have a lower mass (e.g., compared to some magnetic materials such as steel) and more efficient heat dissipation properties.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1A:
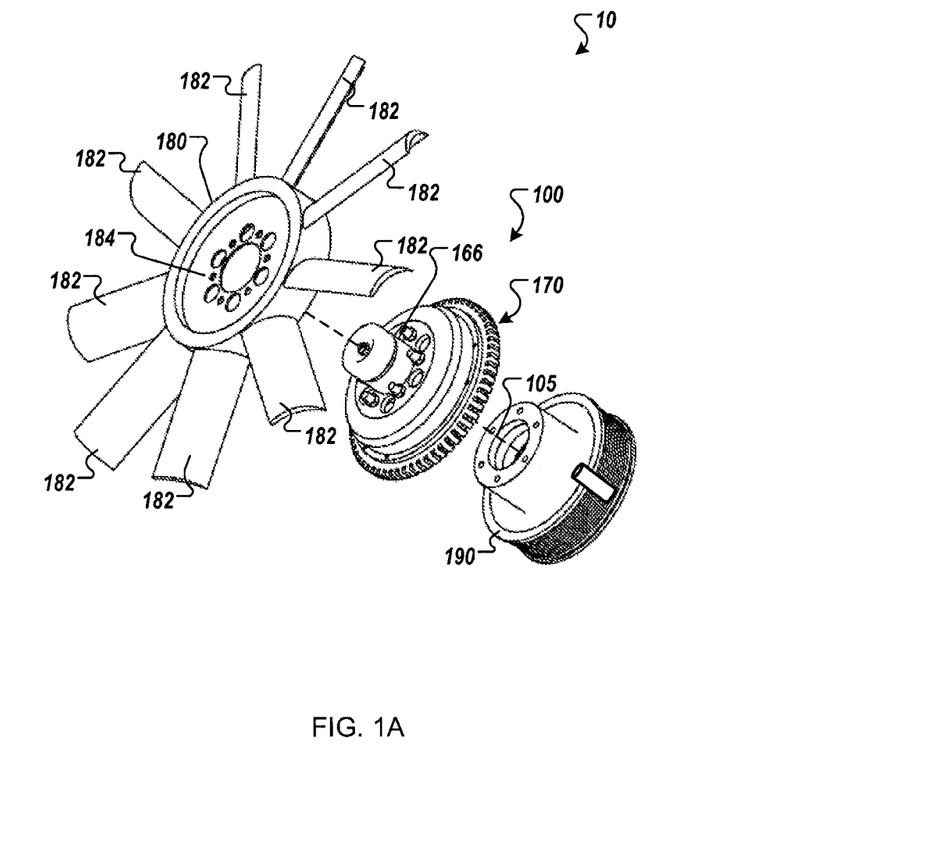
FIG. 1A is a perspective exploded view of a fan clutch system including a clutch device coupled between a fan blade device and a drive member, in accordance with some embodiments.
Figure 1B:
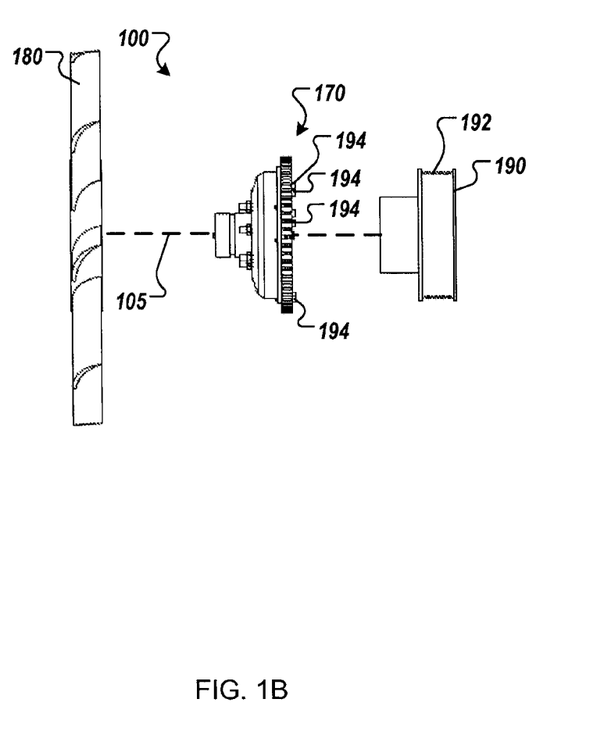
FIG. 1B is a side exploded view of the fan clutch system of FIG. 1A.
Figure 1C:
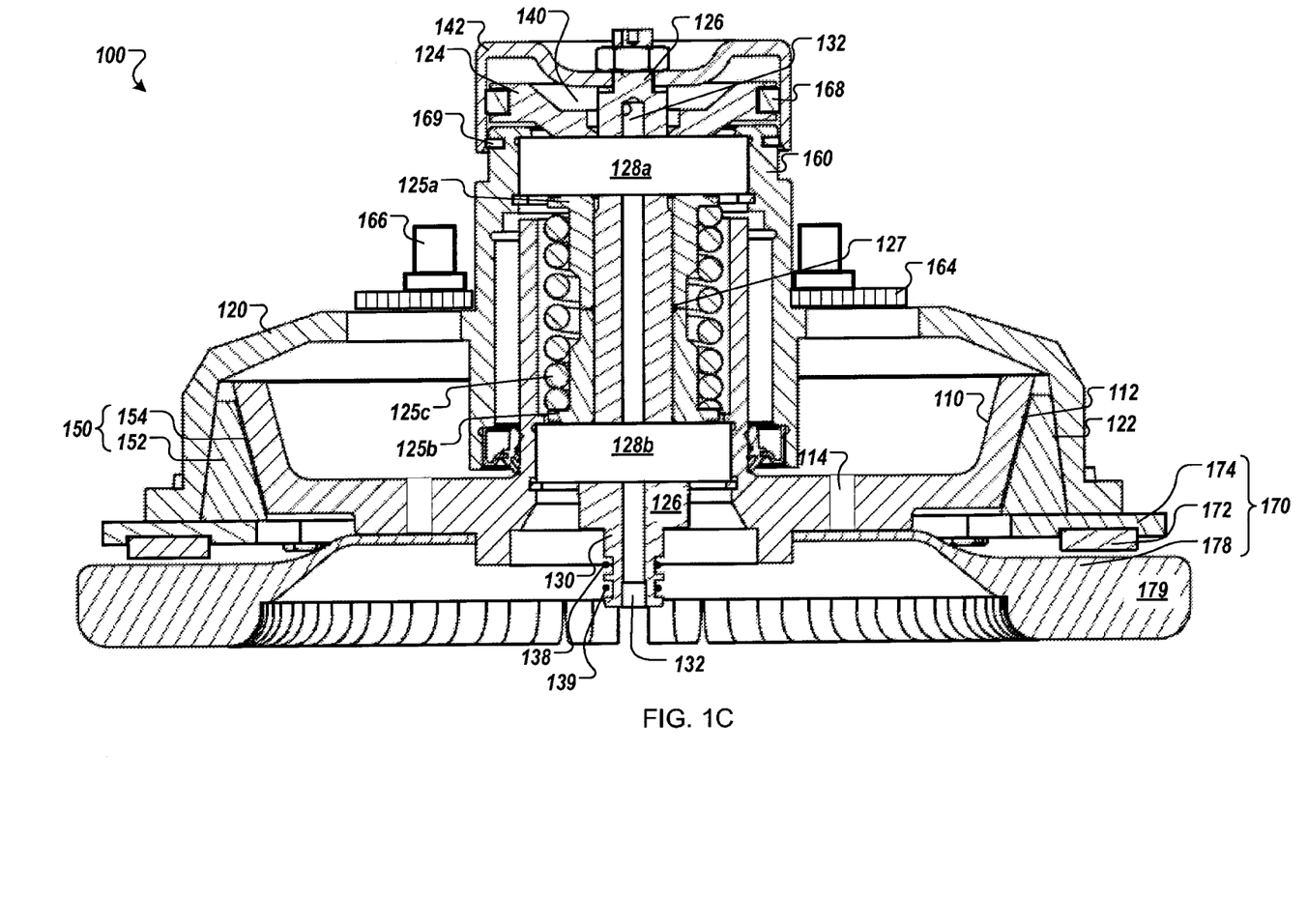
FIG. 1C is a cross-sectional side view of the clutch device of the clutch system of FIG. 1A.

Referring to FIGS. 1A, 1B, and 1C, some embodiments of a clutch system 10 can include a clutch device 100 that couples a fan blade device 180 to a drive pulley 190. The drive pulley 190 may be driven to rotate about a central axis 105 via a belt connection 192 with a component of a vehicle engine. As such, the clutch system may be assembled into a vehicle, such as near the front of a semi-truck or near the rear of a passenger bus.

As described in more detail below, some embodiments of the clutch device 100 can include an input member 110 and an output member 120 (FIG. 1C). Turning to FIG. 1B, the input member 110 of FIG. 1C (not illustrated) can be mounted to the drive pulley 190 via mounting bolts 194 so that the input member 110 is rotationally coupled with the drive pulley 190. Returning to FIG. 1C, the input member 110 can be selectively coupled to the output member 120 by a frictional drive system 150 so as to rotatingly drive the output member 120 at a first speed. Further, an eddy current drive system 170 can provide rotational output at a second speed (when the clutch friction surfaces are disengaged). In such circumstances, the clutch device 100 can be controlled to provide rotational control, for example, to the fan blade device 180 (as illustrated in FIGS. 1A and 1B) of an engine cooling system in the vehicle. Accordingly, as shown in FIG. 1C, the fan blade device 180 (not illustrated) can be operated at the first speed when a friction ring 152, affixed to the output member 120 at an output surface 122 via mounted bolts (not shown), is axially shifted to engage an opposing friction surface 112 to thereby rotate with the drive pulley 190 or other drive source. Furthermore, the fan blade device 180 can be operated at the second speed due to the operation of the eddy current drive system 170 when the friction ring 152 is axially shifted away from the opposing friction surface 112 to disengage the frictional drive system 150.

Such a multi-speed clutch system can be effective to provide different levels of airflow output from the fan blade device 180. For example, some vehicles may operate with extended periods of idle, such as semi-trucks, buses, vocational equipment (e.g., garbage trucks), or construction equipment vehicles, so the cooling system may periodically activate the clutch device 100 to start rotation of fan blade device 180 to cool the engine. The highspeed rotation of the fan blades in these vehicles might be noticeably loud to both passengers (inside the vehicle cabin) and pedestrians (outside the vehicle cabin), especially when the vehicle is running at idle. However, the clutch device 100 described herein can be implemented within the vehicle cooling systems so that the fan blades are rotated at a second speed even when the cooling system has not activated the clutch device 100 to frictionally engage the friction ring 152 with the friction surface 112. The second speed of the fan blade device 180 may be less than the first speed, and thus the noise from the fan blade device 180 may be reduced. Furthermore, the clutch device 100 facilitates the flow of cooling air both when the vehicle cooling controller activates the fan (e.g., by causing the clutch friction surfaces to engage) and when the vehicle cooling controller deactivates the fan (e.g., by causing the clutch friction surfaces to disengage). Thus, the vehicle's engine temperature can be maintained below a threshold level for a greater period of time, which reduces the frequency that clutch device 100 must be activated by the cooling system to rotate the cooling fan at the first (and perhaps louder) speed.

Briefly, in operation, the clutch system 10 may include a drive source such as the drive pulley 190 that is rotated at a first speed due to connection with an engine output shaft via a belt, chain, gear, or the like. (Note that the fan blade device 180 and the drive pulley 190 are removed from FIG. 1C for purposes of illustration, but are depicted in FIGS. 1A-1B.) The clutch device 100, as illustrated in FIG. 1C, includes the input member 110 that is directly or indirectly mounted to the drive pulley 190 so as to rotate at the first speed with the drive pulley 190. In this embodiment, the input member 110 includes two or more mounting holes 114 to receive mounting bolts (not shown) that couple the input member 110 to the drive pulley 190. The clutch device 100 also includes the output member 120 that can be actuated to engage or disengage with the input member 110. For example, the output member 120 can axially shift in response to movement of a piston 124 that is adjustable relative to the input member 110. The axial movement of the output member 120 can cause the friction ring 152 to axially shift into frictional engagement or disengagement with the friction surface 112 on the input member 110. When the friction ring 152 is shifted to the engaged position, the output member 120 is urged to rotate at the first speed with the input member 110 and the drive pulley 190. Because the fan blade device 180 is mounted to a front face of the output member 120 (e.g., via two or more mounting studs 166 or other removable coupling mechanism), the fan blade device 180 likewise rotates at the first speed with the input member 110 and the drive pulley 190 when the friction ring 152 (couple to the output member 120) frictionally engages the input member 110.

The friction ring 152 and the friction surface 112, in some implementations, are generally defined by a frusto-conical friction interface in which the radius of the frusto-conical friction interface increases as the frusto-conical friction interface extends away from the drive pulley 190. Conversely, the radius of the frusto-conical friction interface may increase as the frusto-conical friction interface extends towards the drive pulley 190. The friction ring 152 may comprise a metallic, ceramic or other material that is capable of providing frictional engagement and is capable of dissipating heat generated at the frictional interface. For example, some embodiments of the friction ring 152 may comprise a material having a static coefficient or friction in the range of approximately 0.2 to approximately 0.6 and, in particular embodiments, may comprise a material having a static coefficient of friction in the range of approximately 0.4 to approximately 0.5. The shape and orientation of the frusto-conical friction ring 152 and the friction surface 112 may provide the clutch device 100 with a conical wedging action. This conical wedging action may improve the engagement friction, thereby providing enhanced torque transfer capabilities. In other implementations, the friction ring 152 and the friction surface 112 are defined by a substantially flat friction interface.

Still referring to FIGS. 1A-1C, the clutch device 100 also includes the eddy current drive system 170 that urges the output member 120 to rotate at a second speed different from the first speed when the friction ring 152 is shifted to the disengaged position due to axial adjustment of the output member 120. In this embodiment, the eddy current drive system 170 includes a set of two or more permanent magnets 172 arranged along a magnet mounting plate 174 that is attached to the output member 120. In some implementations, the permanent magnets 172 are magnetically coupled to the magnet mounting plate 174. For example, the magnet mounting plate 174 may include a steel portion that provides magnetic coupling for the permanent magnets 172. In other implementations, the permanent magnets 172 are mechanically coupled to the magnet mounting plate 174, in some examples, through the use of screws, bolts, welding, plastic, or a high strength epoxy material.

The eddy current drive system 170 further includes an eddy current ring 178 formed substantially of an electrically conductive material (e.g., aluminum in this embodiment), which is spaced apart from the permanent magnets 172 by a small air gap. The eddy current ring 178 can be mounted to the input member 110 via a set of mounting bolts (not shown). For example, the eddy current ring 178 may have a central portion that abuts with a radial face of the input member 110 such that mounting holes (not shown) in the eddy current ring 178 align with the mounting holes 114 of the input member 110. Thus, when the drive pulley is bolted to the input member 110, the eddy current ring 178 is sandwiched therebetween and rotates with the drive pulley 190 and the input member 110. Accordingly, when the friction ring 152 is shifted to disengage the friction surface 112 so that the output member 120 rotates relative to the input member 110, the permanent magnets 172 (coupled with the output member 120) can move relative to the eddy current ring 178 (coupled to the input member 110). Such relative movement may cause eddy currents to be generated in the eddy current ring 178, which produces a force between the eddy current ring 178 and the permanent magnets 172. Because the eddy current ring 178 is rotated at the first speed along with the input member 110, the force between the permanent magnets 172 and the eddy current ring 178 causes the magnet mounting plate 174 to thereby drive the output member 120 to rotate at the second speed (which may be less than the first speed).

Referring again to FIGS. 1A-1B, in the illustrated embodiment the drive pulley 190 can be rotatably coupled to a support shaft by one or more bearings (not shown). This support shaft may include a central channel that is used to deliver pressurized fluid to the clutch device 100. For example, as illustrated in FIG. 1C, the clutch device 100 may include a central shaft 126 having a coupling end 130 for insertion into a mating region of the support shaft of the drive pulley 190. This coupling end 130 is abutted between a rear bearing 128b and the support shaft of the drive pulley 190 and provides a generally airtight seal so that pressurized fluid delivered through the support shaft of the drive pulley 190 is advanced through a fluid channel 132 of the clutch device 100 and into a fluid receiving chamber 140 at least partially defined by the piston 124. As such, when the clutch device 100 is mounted to the drive pulley 190, the coupling end 130 is pressed into a central channel of the support shaft of the drive pulley 190 so as to provide fluid communication with a fluid supply reservoir.

As shown in FIG. 1C, in some embodiments, the coupling end 130 may include a dual seal arrangement so as to provide enhanced sealing features at the interface between the clutch device 100 and the support shaft of the drive pulley 190. In particular, the coupling end 130 may include a first sealing ring 138 comprising a first polymer material. The coupling end 130 may also include a second sealing ring 139 comprising a second polymer material that is significantly stiffer (e.g., a higher durometer rating) than the first polymer material of the first sealing ring 138. Such an arrangement of the first and second sealing rings 138 and 139 along the coupling end 130 of the clutch device 100 can reduce the likelihood of clutch failure during operation of the vehicle. For example, the clutch device 100 can continue to operate in a satisfactory manner even if one of the two sealing rings 138 and 139 ruptures or leaks after extended wear. The fluid transmitted to or withdrawn from the fluid-receiving fluid receiving chamber 140 of the clutch device 100 may be any suitable liquid or gas. Such fluids may be received, for example, from a pneumatic air supply system or a hydraulic oil supply system.

The fluid-receiving fluid receiving chamber 140 may be at least partially defined by a front face of the piston 124 and a nose cap 142. The nose cap 142 can be mounted to a forward end of the central shaft 126, and thus remains generally fixed relative to the stationary central shaft 126. As such, when pressurized air is delivered into the fluid-receiving fluid receiving chamber 140, the piston 124 is adjusted a small distance in an axially rearward direction relative to the nose cap 142 and the central shaft 126. A seal ring 168 and a dust wiper 169 can be arranged proximate to an outer periphery of the piston 124 so as to seal the single leak path at the periphery.

Still referring to FIG. 1C, the rear face of the piston abuts with a forward bearing 128a, which is axially adjustable with the piston 124. The forward bearing 128a is mounted to a first spring-engaging member 125a, which slidably shifts along the central shaft 126 relative to a second spring-engaging member 125b. A spring 125c is arranged between the first and second spring engaging members 125a-b and biases the forward bearing 128a and the piston 124 toward the nose cap 142 at the front of the clutch device 100. Thus, when the pressurized fluid is delivered into the fluid-receiving fluid receiving chamber 140, the piston 124, the forward bearing 128a, and the first spring-engaging member 125a are adjusted a small distance in an axially rearward direction against the bias force of the spring 125c. When the pressurized fluid is evacuated from the fluid-receiving fluid receiving chamber 140, the spring 125c urges the piston 124, the forward bearing 128a, and the first spring-engaging member 125a to return to an axially forward position. As described below, this reciprocating motion causes the friction ring 152 to adjust into and out of engagement with the input member 110. In some implementations, two or more springs can be used in the place of the spring 125c.

The second spring-engaging member 125b abuts with an inner race of the rear bearing 128b, which also abuts on an opposite side with a collar 127 of the central shaft 126. Accordingly, the rear bearing 128b remains generally axially stationary with the central shaft 126 while the forward bearing 128a can axially adjust relative to the central shaft 126 (as previously described). The input member 110 is mounted on the rear bearing 128 so that the input member 110 is rotatable relative to the central shaft 126 but remains axially stationary relative to the central shaft 126. The output member 120 is mounted on the forward bearing 128a so that the output member 120 is rotatable relative to the central shaft 126 and is axially adjustable relative to the central shaft 126 when the piston 124 and forward bearing 128a are axially shifted.

Still referring to FIG. 1C, in this embodiment, the output member 120 of the clutch device 100 includes a central hub region 160 and a fan-mounting region 164. When the fluid-receiving fluid receiving chamber 140 is pressurized, the piston 124 is urged against the force of the spring 125c, causing the forward bearing 128a to adjust in an axially rearward direction. The output member 120, which is mounted on the forward bearing 128a, axially adjusts in the rearward direction along with the forward bearing 128a. As shown in FIG. 1C, this rearward axial adjustment of the output member 120 creates a narrow gap between the friction ring 152 and the friction surface 112, thereby permitting the output member 120 to rotate relative to the input member 110. When the pressurized fluid is evacuated from the fluid-receiving fluid receiving chamber 140, the piston 124, the forward bearing 128a, and the output member 120 are urged by the spring 125c in an axially forward direction, which causes the friction ring 152 to press against the opposing friction surface 112 and couple the output member 120 to the input member 110.

The fan-mounting region 164 of the output member 120 is configured to receive a fan blade device 180 (as shown in FIGS. 1A and 1B) or another output instrument to be rotated. In particular, the fan-mounting region 164 may include two or more mounting studs 166 that are configured to receive the fan blade device 180. As shown in FIGS. 1A-1B, the fan blade device 180 can be configured to fit over the central hub region 160 of the output member 120 and engage with a front face of the fan-mounting region 164. The fan blade device 180 can include a plurality of fan blade structures 182 that are arranged to generate air flow, for example, as part of a vehicle's engine cooling system. The fan blade structures 182 can be angled, tapered, curved, or otherwise configured to direct the output of air flow. In the illustrated embodiment of FIG. 1A, the fan blade device 180 includes two or more mounting holes 184 that are configured to receive the mounting studs 166 extending from the clutch device 100. In alternative embodiments, the output member 120 of the clutch device 100 may be configured to receive an output instrument other than a fan blade device 180. For example, the fan-mounting region 164 may be configured to connect with other components that are to be selectively rotated, such as output shafts, gears, brake systems, and the like. Accordingly, in these embodiments, the output member 120 serves as both the component that shifts friction ring 152 to engage or disengage the input member 110 and the component that receives an output instrument (such as the fan blade device 180 in FIGS. 1A-1B).

In various implementations, the eddy current ring 178 can include a number of cooling fins 179. In the example of the clutch device 100, the cooling fins 179 extend radially outward from the outer periphery of the eddy current ring 178. For example, the cooling fins 179 can be formed of the same material as the eddy current ring 178 (e.g., machined into a single piece of metal). The cooling fins 179, for example, may extend substantially from a point radially outward of the outer position of the permanent magnets 172. In other implementations, the cooling fins 179 are coupled to the eddy current ring 178. In other embodiments, cooling fins may additionally or alternatively be formed in or otherwise coupled to the magnet mounting plate 174. In some embodiments, the cooling fins 179 may be formed in such an arrangement to provide effective dissipation of heat that may be generated in the eddy current ring 178 when the input member 110 and output member 120 are not frictionally engaged. For example, the described radial arrangement may place the cooling fins 179 in a flow of air generated by rotation of the fan blades 182. In the embodiment illustrated in FIGS. 1A-1C, the permanent magnets 172 and the eddy current ring 178 are arranged axially rearward of the engagement surface and the friction surface 112. In some embodiments, the cooling fins 179 may be formed in such an arrangement to provide effective dissipation of heat that may be generated in the eddy current ring 178 when the input member 110 and output member 120 are not frictionally engaged. For example, according to the example shown in FIG. 1C, the cooling fins 179 can rotate at the first speed with the drive pulley to provide substantially similar heat dissipation of the eddy current ring 178 during the engaged and disengaged stages of operation of the clutch device 100.

In some embodiments, this arrangement can provide sufficient space for the eddy drive system 170 components and the cooling fins 179 without having to increase the outer radius of the clutch device 100 in the region that is directly radially outward from an engagement surface 154 and the friction surface 112. For example, by not increasing the outer radius of the clutch device 100, the clutch device 100 may be implemented to retrofit a friction-only (e.g., engaged or disengaged) clutch system with one that provides two speed operation (e.g., eddy coupled or frictionally coupled). A conversion kit may include the magnet mounting plate 174, the eddy current ring 178, the cooling fins 179, the set of permanent magnets 172, and appropriate tools and fasteners to couple the components of the eddy drive system 170 to the friction-only clutch system. In some implementations, the eddy current ring 178 and the magnet mounting plate 174 may be designed to be detachably coupled to an input member and an output member of the friction-only clutch system, respectively, and to be able to rotate relatively during the disengagement of the friction-only clutch system. The set of permanent magnets 172 may be magnetically coupled to the magnet mounting plate 174. Accordingly, the relative rotation between the permanent magnets 172 and the eddy current ring 178 may generate an eddy current in the eddy current ring 178, in which the resulting magnetic force urges the permanent magnets 172, and therefore the output member of the friction-only clutch system, to rotate at the second speed during the disengagement of the friction-only clutch system.

In some implementations of the clutch device 100, when the fan blade device 180 spins during engagement, it can produce a thrust component substantially in the same direction as the spring force. This force can increase the overall frictional force between the input and output members 110, 120, which can increase the torque of the output member 120. In selective embodiments, the thrust component from the rotation of the fan blade device during the engagement of the clutch device 100 can depend on the number of fan blades, diameter of the fan blade device, and the first speed. Example number of fan blades may be 5, 7, 9, 11, or 13. The diameter of the fan blade device may range from about 20 inches to about 30 inches, about 25 inches to about 35 inches, or about 30 inches to about 40 inches. The diameter of the fan blade device may be about 36 inches, for example. Increasing the number of fan blades, the diameter of the fan blade device, or both, can lead to higher thrust component. Also, during the engagement of the clutch device, the first speed of the fan blade device can be substantially similar to rotational speed of the drive pulley 190, which may vary according to the rotational speed of the engine output shaft. Increasing the first speed can increase the thrust component.

Figure 2:
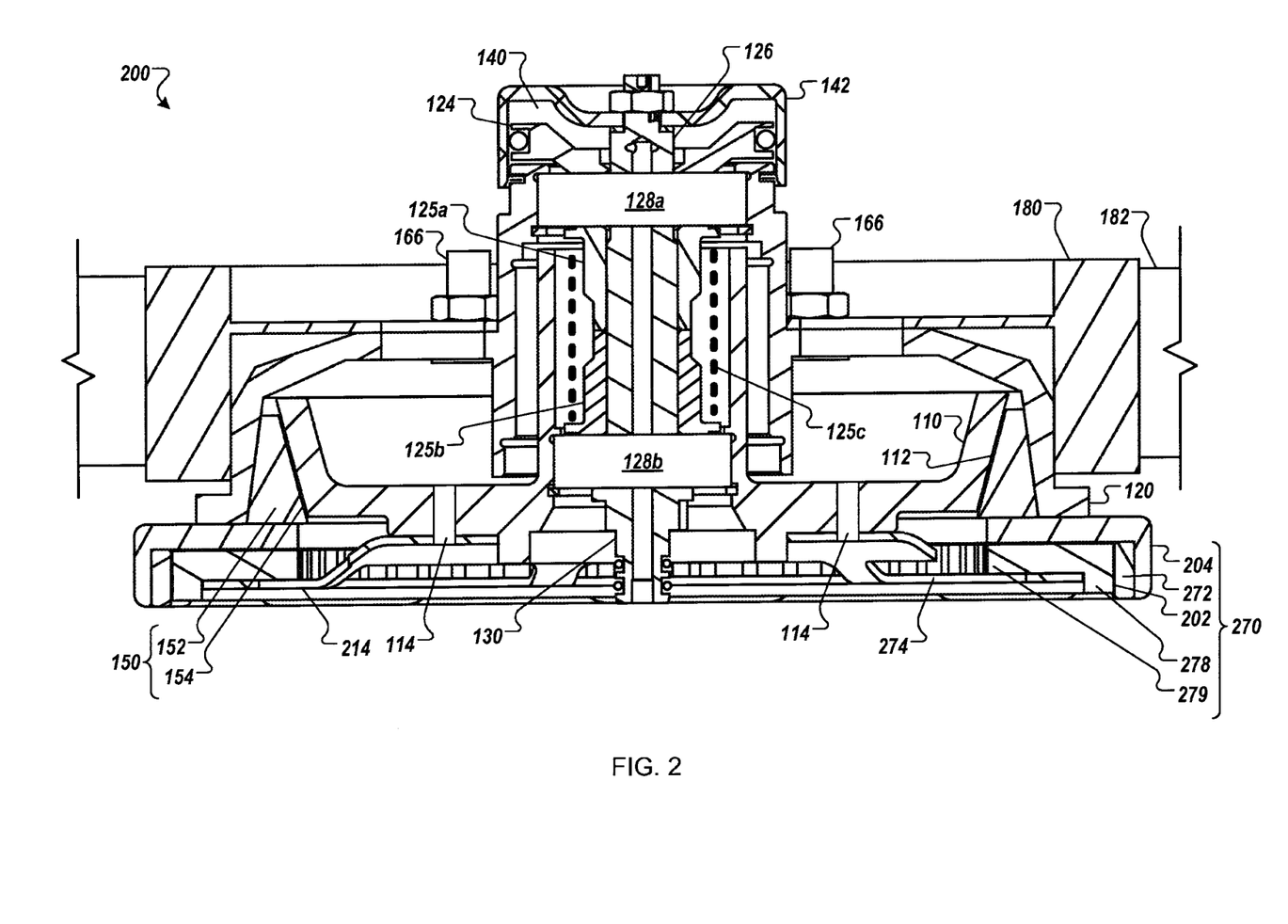
FIG. 2 is a cross-sectional side view of an alternative clutch device for use in a fan clutch system, in accordance with some embodiments.

Referring now to FIG. 2, some embodiments of the clutch system 10 may include the fan blade device 180 that is coupled to a clutch device 200 that is different from the clutch device 100 illustrated in FIG. 1C. For example, the clutch device 200 may include an eddy current drive system 270 that is configured differently from the eddy current drive system 170 described in connection with FIG. 1C.

As shown in FIG. 2, the clutch device 200 may include the input member 110, the output member 120, and the friction ring 152 having substantially the same configuration as the previously described embodiments depicted in FIGS. 1A-C. Also, similar to the previously described embodiments, the clutch device 200 depicted in FIG. 2 may include the central shaft 126 having the coupling end 130, the first and second spring-engaging members 125a-b. the spring 125c, the forward bearing 128a, the rear bearing 128b, the piston 124, the nose cap 142, and the mounting studs 166 to receive the fan blade device 180.

Accordingly, the friction drive system 150 of the clutch device 200 (FIG. 2) may operate in the manner as described in connection with the embodiments previously described in connection with FIGS. 1A-C. As shown in FIG. 2, when the fluid-receiving fluid receiving chamber 140 is pressurized, the piston 124 is urged against the force of the spring 125c, causing the forward bearing 128a to adjust in an axially rearward direction. The output member 120, which is mounted on the forward bearing 128a, axially adjusts in the rearward direction along with the forward bearing 128a. As shown in FIG. 2, this rearward axial adjustment of the output member 120 creates a narrow gap between the friction ring 152 and the friction surface 112, thereby permitting the output member 120 to rotate relative to the input member 110. When the pressurized fluid is evacuated from the fluid-receiving fluid receiving chamber 140, the piston 124, the forward bearing 128a, and the output member are urged by the spring 125c in an axially forward direction, which causes the friction ring 152 to press against the opposing friction surface 112 and couple the output member 120 to the input member 110.

The clutch device 200 depicted in FIG. 2 includes the eddy current drive system 270 that is different from the eddy current drive system 170 depicted in FIG. 1C. For example, the eddy current drive system 270 can include a set of permanent magnets 272 that are spaced apart from an eddy current ring 278 so as to define a circumferential gap 202 therebetween. In this embodiment, the permanent magnets 272 are affixed about the inner periphery of a magnet ring 204 by bolts (not shown), which is in turn assembled to the output member 120. As such, the permanent magnets 272 are coupled with the output member 120, and the output member 120 rotates when the permanent magnets 272 are driven to rotate. The eddy current ring 278 is mounted to an extension plate 214 that is mounted to the input member 110 (via bolts through the mounting holes 114). As such, the eddy current ring 278 rotates with the input member 110, which is driven to rotate drive the drive pulley 190 (as illustrated in relation to FIG. 1A).

As previously described, when the output member 120 is not frictionally engaged to the input member 110 (via the friction ring 152), the output member 120 is not driven to rotate at the same speed as the input member 110. Due to this relative rotation between the input member 110 and the output member 120, the eddy current ring 278 is driven to rotate relative to the set of permanent magnets 272. In some implementations, eddy currents may be induced in the eddy current ring 278 as it rotates relative to the permanent magnets 272, thereby urging the permanent magnets 272 (and magnet ring 204) to rotate at a second, slower speed. The magnet ring 204 is affixed to the output member 120, so it urges the output member 120 (and the fan blade device 180 mounted thereto) to rotate at the second, slower speed under the influence of the eddy current drive system 270 when the input member 110 and the output member 120 are not frictionally engaged.

In the embodiment illustrated in FIG. 2, the permanent magnets 272 and the eddy current ring 278 are arranged axially rearward of the engagement surface 154 and the friction surface 112. This arrangement can provide sufficient space for the eddy drive system 270 components and extending cooling fins 279 without having to increase the outer radius of the clutch device 200 in the region that is directly radially outward from the engagement surface 154 and the friction surface 112. For example, because the outer radius of the clutch device 200 is not significantly increased outward from the engagement surface 154 and the friction surface 112, the clutch device 200 may be implemented to retrofit a friction-only (e.g., engaged or disengaged) clutch system with one that provides two speed operation (e.g., eddy coupled or frictionally coupled).

Still referring to FIG. 2, the permanent magnets 272 can be carried by the magnet ring 204 so that the permanent magnets 272 are oriented to face radially inward along one or more inner circumferential surfaces of the magnet ring 204. In such circumstances, the eddy current ring 278 may be arranged radially inward of the permanent magnets 272 so that an outer circumferential surface of the eddy current ring 278 is adjacent to the permanent magnets 272 with the circumferential air gap 202 therebetween. The air gap 202 can be configured to be large enough so as to avoid frictional contact between the permanent magnets 272 and the eddy current ring 278. Also, the circumferential air gap 202 can be configured to be small enough so that relative movement between the eddy current ring 278 and the magnet ring 204 induces the formation of eddy currents in the conductive material of the magnet ring 204. For example, in this embodiment, the circumferential air gap 202 between the permanent magnets 272 and the eddy current ring 278 is about 0.125 inches or less, about 0.005 inches to about 0.100 inches, and preferably about 0.020 inches. The eddy currents are formed in the eddy current ring 278 in response to relative motion of the permanent magnets 272 because a moving magnetic field intersects a conductor (e.g., the conductive eddy current ring 278). Accordingly, the eddy current drive system 270 can create a force that urges the magnet ring 204, and thus the output member 120, to rotate at a second speed that is different from the first rotational speed of the input member 110 and the drive pulley 190. Further, the size of the air gap 202 between the permanent magnets 272 and the eddy current ring 278 is not dependent upon the axial position of the piston 124 or the output member 120. The air gap 202 remains generally constant even when the piston 124 adjusts to cause the output member 120 to shift from the frictionally engaged condition to the frictionally disengaged condition.

Still referring to FIG. 2, the inner periphery of the eddy current ring 278 includes a number of cooling fins 279 extending radially inward. In some embodiments, the cooling fins 279 may be formed in such an arrangement to provide effective dissipation of heat that may be generated in the eddy current ring 278 when the input member 110 and output member 120 are not frictionally engaged. In some embodiments, this arrangement can provide sufficient space for the eddy drive system 270 components and the cooling fins 279 without having to increase the outer radius of the clutch device 200 in the region that is directly radially outward from the engagement surface 154 and the friction surface 112. For example, by not increasing the outer radius of the clutch device 100, the clutch device 100 may be implemented to retrofit a friction-only (e.g., engaged or disengaged) clutch system with one that provides two speed operation (e.g., eddy coupled or frictionally coupled).

In some implementations, the inwardly radial placement of the cooling fins 279 may at least partly shield the cooling fins from damage by external objects, or vice versa. For example, the described inwardly radial arrangement may protect the cooling fins 279 from being damaged by road debris, or other materials that may inadvertently come into contact with the clutch device 200. In another example, the described inwardly radial arrangement may substantially keep the cooling fins 279 away from encountering and damaging or injuring objects that may inadvertently come into contact with the clutch device 200 while it is rotating (e.g., loose wires, dangling hoses, a mechanic's fingers).

Figure 3:
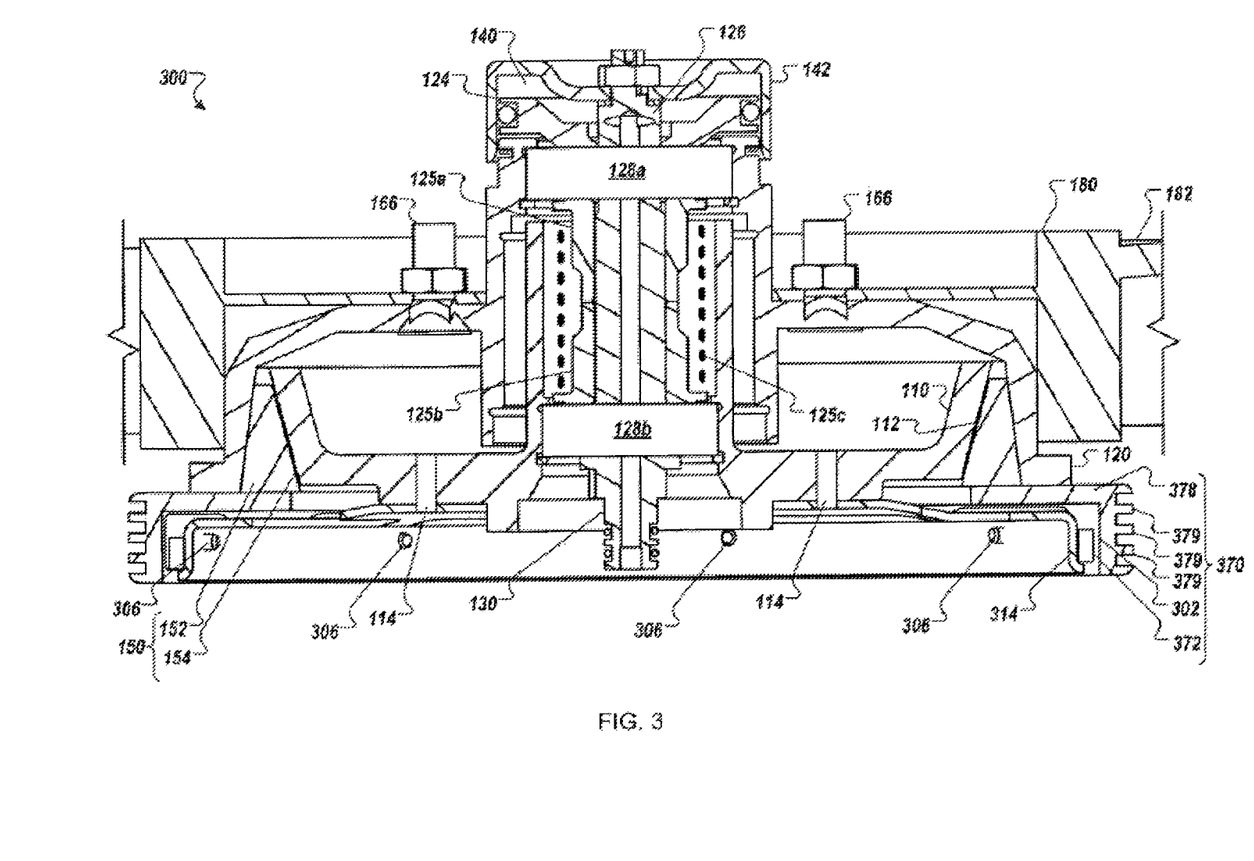
FIG. 3 is a cross-sectional side view of another alternative clutch device for use in a fan clutch system, in accordance with some embodiments.

Referring now to FIG. 3, some embodiments of the clutch system 10 may include the fan blade device 180 that is coupled to a clutch device 300 that is different from the clutch devices 100 and 200 illustrated in FIGS. 1C and 2, respectively. For example, the clutch device 300 may include an eddy current drive system 370 that is configured differently from the eddy current drive systems 170 and 270 described in connection with FIGS. 1C and 2, respectively.

Referring to FIG. 3, the clutch device 300 may include the input member 110, the output member 120, and the friction ring 152 having substantially the same configuration as the previously described embodiments. Also, similar to previously described embodiments, the clutch device 300 depicted in FIG. 3 may include the central shaft 126 having the coupling end 130, the first and second spring-engaging members 125a-b, the spring 125c, the forward bearing 128a, the rear bearing 128b, the piston 124, the nose cap 142, and the mounting studs 166 to receive the fan blade device 180.

Accordingly, the friction drive system 150 of the clutch device 300 may operate in the manner as described in connection with the previous embodiments. As shown in FIG. 3, when the fluid-receiving fluid receiving chamber 140 is pressurized, the piston 124 is urged against the force of the spring 125c, causing the forward bearing 128a to adjust in an axially rearward direction. The output member 120, which is mounted on the forward bearing 128a, axially adjusts in the rearward direction along with the forward bearing 128a. As shown in FIG. 3, this rearward axial adjustment of the output member 120 creates a narrow gap between the friction ring 152 and the friction surface 112, thereby permitting the output member 120 to rotate relative to the input member 110. When the pressurized fluid is evacuated from the fluid-receiving fluid receiving chamber 140, the piston 124, the forward bearing 128a, and the output member are urged by the spring 125c in an axially forward direction, which causes the friction ring 152 to press against the opposing friction surface 112 and couple the output member 120 to the input member 110 (so that the output member 120 rotates with the input member 110 at the speed of the drive pulley 190 (shown in FIGS. 1A-B)).

The clutch device 300 depicted in FIG. 3 may include the eddy current drive system 370 in which a set of permanent magnets 372 and an eddy current ring 378 are arranged to define a narrow circumferential air gap 302 therebetween. In this embodiment, the permanent magnets 372 are affixed about the outer periphery of a magnet-mounting plate 314 (by bolts 306), which can be mounted to the input member 110 (via bolts through the mounting holes 114). As such, the permanent magnets 372 rotate with the input member 110, which is driven to rotate the drive pulley 190 (FIG. 1A). In this implementation, an eddy current ring 378 is assembled to the output member 120 so that the eddy current ring 378 is arranged radially outward of the set of permanent magnets 372. As such, the eddy current ring 378 is coupled with the output member 120, and the output member 120 rotates when the eddy current ring 378 is driven to rotate.

As previously described, when the output member 120 is not frictionally engaged to the input member 110 (via the friction ring 152), the output member 120 is not driven to rotate at the same speed as the input member 110. Due to this relative rotation between the input member 110 and the output member 120, the eddy current ring 378 is driven to rotate relative to the set of permanent magnets 372. In some implementations, eddy currents may be induced in the eddy current ring 378 as it rotates relative to the permanent magnets 372, thereby urging the eddy current ring 378 to rotate at a second, slower speed while the permanent magnets 372 rotate substantially at the drive speed of the drive pulley 190 (e.g., the rotational speed of the input member 110). The eddy current ring 378 is affixed to the output member 120, so that it urges the output member 120 (and the fan blade device 180 mounted thereto) to rotate at the second, slower speed under the influence of the eddy current drive system 370 when the input member 110 and the output member 120 are not frictionally engaged.

In the embodiment illustrated in FIG. 3, the eddy current drive system 370 (including the permanent magnets 372 and the eddy current ring 378) is arranged axially rearward of the frusto-conical engagement surface 154 and the friction surface 112. This arrangement can provide sufficient space for the eddy drive system 370 components and a set of cooling fins 379 without having to increase the outer radius of the clutch device 300 in the region that is directly radially outward from the engagement surface 154 and the friction surface 112. For example, because the outer radius of the clutch device 300 is not significantly increased outward from the engagement surface 154 and the friction surface 112, the clutch device 300 may be implemented to retrofit a friction-only (e.g., engaged or disengaged) clutch system with one that provides two speed operation (e.g., eddy coupled or frictionally coupled).

Still referring to FIG. 3, the permanent magnets 372 can be carried by the magnet-mounting plate 314 so that the permanent magnets 372 are oriented to face radially outward along at least one outer circumferential surface of the magnet-mounting plate 314. In such circumstances, the eddy current ring 378 may be arranged radially outward of the permanent magnets 372 so that an inner circumferential surface of the eddy current ring 378 is adjacent to the permanent magnets 372 with a small circumferential air gap 302 therebetween. The circumferential air gap 302 can be configured to be large enough so as to avoid frictional contact between the permanent magnets 372 and the eddy current ring 378. Also, the circumferential air gap 302 can be configured to be small enough so that relative movement between the permanent magnets 372 and the eddy current ring 378 induces the formation of eddy currents in the conductive material of the eddy current ring 378. For example, in this embodiment, the circumferential air gap 302 between the permanent magnets 372 and the eddy current ring 378 is about 0.125 inches or less, about 0.005 inches to about 0.100 inches, and about 0.020 inches. Accordingly, the eddy current drive system 370 can create a force that urges the eddy current ring 378, and thus the output member 120, to rotate at a second speed that is different from the first rotational speed of the input member 110 and the drive pulley 190. Further, the size of the circumferential air gap 302 between the permanent magnets 372 and eddy current ring 378 is not dependent upon the axial position of the piston 124 or the output member 120. The circumferential air gap 302 remains substantially constant even when the piston 124 adjusts to cause the output member 120 to shift from the frictionally engaged condition to the frictionally disengaged condition.

In the embodiment illustrated in FIG. 3, the outer periphery of the eddy current ring 378 includes a number of cooling fins 379 extending in a radially outward direction. In some implementations, each of the cooling fins 379 can extend fully around a circumference of the eddy current ring 378. Alternatively, the cooling fins 379 can be arranged in a manner similar to the cooling fins 179 depicted in FIG. 1C, or the cooling fins 379 can be formed of a single continuous spiral. In some embodiments, the cooling fins 379 may be formed in such an arrangement to provide effective dissipation of heat that may be generated in the eddy current ring 378 when the input member 110 and output member 120 are not frictionally engaged. For example, the cooling fin arrangement depicted in FIG. 3 may place the cooling fins 379 in a flow path generated by rotation of the fan blades 182. In some embodiments, this arrangement can provide sufficient space for the eddy drive system 370 components and the cooling fins 379 without having to increase the outer radius of the clutch device 300 in the region that is directly circumferentially outward from the engagement surface 154 and the friction surface 112. For example, by not increasing the outer radius of the clutch device 300, the clutch device 300 may be implemented to retrofit a friction-only (e.g., engaged or disengaged) clutch system with one that provides two speed operation (e.g., eddy coupled or frictionally coupled).

A number of embodiments of the invention have been described. Nevertheless, it will be understood that various modifications may be made without departing from the spirit and scope of the invention. Accordingly, other embodiments are within the scope of the following claims.

What is claimed is:

1. A fan clutch device to be mounted to a drive pulley, the fan clutch device comprising:
    an input member that is removably mountable with the drive pulley such that the input member rotates with the drive pulley;
    an output member that is adjustable in an axial direction between first and second positions relative to the input member;
    a clutch ring arranged between the input member and the output member, the clutch ring including a first friction surface that engages an opposing friction surface when the output member is in the first position such that the output member rotates at a first speed with the input member;
    a piston which is adjustable in an axial direction relative to the input member;
    a central shaft passing through first and second bearings, the output member being mounted on the first bearing and the input member being mounted on the second bearing;
    first and second spring-engaging members which are disposed between the first and second bearings;
    a spring arranged between the first and second spring-engaging members which biases the piston, the first bearing, and the first spring-engaging member toward a nose cap at a front of the fan clutch device; and
    an eddy current drive system that urges the output member to rotate at a second speed different from the first speed when the output member is in the second position, the eddy current drive system including:
        permanent magnets circumferentially disposed on a magnet mounting plate, the magnet mounting plate being coupled the output member so as to rotate with the output member, and
    an electrically conductive ring attached to the input member
    wherein the permanent magnets and the electrically conductive ring are positioned axially rearward of the clutch ring,
    wherein a fluid-receiving fluid chamber is defined in part by the piston and the nose cap such that when pressurized air enters the fluid-receiving chamber, the piston, the first bearing, and the first spring-engaging member are adjusted in an axially rearward direction against a bias force of the spring thereby urging the output member into the second position, and
    wherein the permanent magnets and the ring magnet mounting plate are disposed axially forward of the electrically conductive ring such that the permanent magnets and the electrically conductive ring present an axial gap therebetween.

2. The device of claim 1, wherein the output member comprises a front face to receive a fan blade device in an output position that is axially forward of the clutch ring.

3. The device of claim 1, wherein the first friction surface of the clutch ring comprises a frusto-conical friction surface.

4. The device of claim 1, wherein the electrically conductive ring includes radially extending cooling fins to dissipate heat.

5. The device of claim 1, wherein
    the electrically conductive ring is comprised of a generally nonmagnetic material, and
    the eddy current drive system substantially includes no magnetic material positioned to oppose the permanent magnets.

6. The device of claim 1, wherein the magnet mounting plate includes a ring, and an outer diameter of the ring of the magnet mounting plate is greater than an outer diameter of the output member.

7. The device of claim 6, wherein an outer diameter of the electrically conductive ring is greater than the outer diameter of the ring of the magnet mounting plate.

8. The device of claim 1, wherein an axially rear face of the output member presents a flange, and a width of the permanents magnets is greater than a width of the flange of the axially rear face of the output member.

9. The device of claim 6, wherein an inner diameter of the ring of the magnet mounting plate is greater than an outer diameter of an axially rearward radial face of the input member.

* * * * *